(No Model.)
L. SCHARFF.
COMBINED COOLER AND FILTER.
No. 247,117. Patented Sept. 13, 1881.
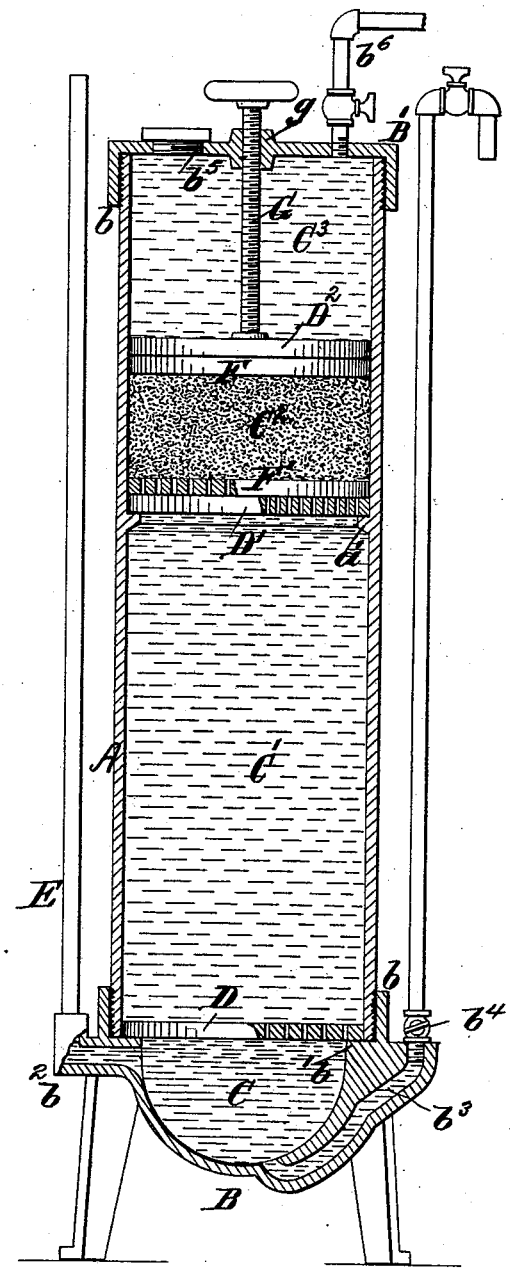
WITNESSES:
S. J. Van Stavoren
A. A. Connolly
INVENTOR,
Louis Scharff,
By Connolly Bros,
ATTORNEYS
N. PETERS, Photo-Lithographer, Washington, D. C.

UNITED STATES PATENT OFFICE.

LOUIS SCHARFF, OF SPRING MILL, PENNSYLVANIA.

COMBINED COOLER AND FILTER.

SPECIFICATION forming part of Letters Patent No. 247,117, dated September 13, 1881.

Application filed May 25, 1881. (No model.)

*To all whom it may concern:*

Be it known that I, LOUIS SCHARFF, a citizen of the United States, residing at Spring Mill, in the county of Montgomery and State of Pennsylvania, have invented certain new and useful Improvements in Combined Coolers and Filters; and I do hereby declare the following to be a full, clear, and exact description of the invention, reference being had to the accompanying drawing, which forms part of this specification, and which is a transverse vertical section of a combined cooler and filter embodying my invention.

My invention has relation to water filters and coolers; and it consists of certain improvements in the apparatus shown and described in Letters Patent of the United States granted to me December 12, 1865.

These improvements pertain specially to the filtering portion proper of the apparatus, and embrace features therein whereby the density of the filtering material may be regulated by pressure, so as to adapt it to the filtration of waters of different degrees of impurity.

As shown in the accompanying drawing, the body of the apparatus consists of a cylinder, A, of iron, porcelain or cement lined, and closed at its upper and lower ends by flanged caps or heads B and B', of cast-iron, which screw onto said cylinder, as shown. The internally-threaded flanges $b$ of the heads B and B' overlap the ends of the cylinder A, and the joints are suitably packed to prevent leakage.

The interior of the apparatus is separated into four chambers, C, C', C², and C³, by the three perforated partitions D, D', and D², of iron or other suitable material, the former of which rests upon an internal shoulder, $b'$, of the lower head, B, and the partition D' upon a ledge, $a'$, formed within the cylinder A of the apparatus. The lower or sediment chamber, C, is formed entirely within the semi-spherical lower head, B, beneath the perforated partition D, and at one side of the head, close to the top of said chamber, is formed a hollow branch, $b^2$, into which is screwed an inlet-pipe, E, while with the bottom of the chamber communicates a passage, $b^3$, formed in an enlargement of the head, and extending upward around the latter to the top of the same, where it terminates in a blow-off cock, $b^4$. The central or water-chamber, C', is of greater capacity than any of the other chambers, and is situated between the two perforated partitions D and D', and the intermediate or filtering chamber, C², above the latter partition, is filled, or nearly filled, with a mixture of sand and charcoal or other filtering medium, contained between terra-cotta plates F F', to which access can be had through a hand-hole, $b^5$, in the upper cap, B', the latter being also provided with an outlet-pipe, $b^6$.

In the present improvement I dispense with the rod extending from the top to the bottom of the apparatus, but employ a screw-rod, G, which impinges at its lower end against the partition or plate D², and passes through a threaded opening, $g$, in the cap or head B'. By raising or lowering the rod the pressure of the plate D² upon the filtering material may be regulated at pleasure, so as to vary the density of the latter, and thus adapt it to different conditions of water or the degrees of filtration required. The terra-cotta plates are of advantage in arresting the passage of impurities which might pass through the sand and charcoal, and also in preventing particles of the latter from escaping into the filtered liquid. The iron plates D' D² re-enforce the terra-cotta plates, so that if the latter or either of them should be cracked or broken by the pressure exerted in compressing the packing, said terra-cotta plates will not become displaced or ineffective. The pressure-rod G, extending through the top of the filter, permits compression to be effected by turning said rod without removing the cap of the filter. This is of special importance in cases where the filter is buried, as hereinafter set forth, as in such cases to open the filter to compress the packing would be very inconvenient.

If the apparatus is to be used as a water-cooler as well as a filter, it may be arranged within an ice-box, or may be buried beneath the surface of the ground, and it may also, if desired, be combined with a receiving-vessel communicating with the upper chamber, C³, through the pipe $b^6$, as described in my aforesaid patent of December 12, 1865; but I propose in most cases to make the apparatus of sufficient capacity to enable the second vessel or reservoir to be dispensed with.

In using the apparatus the blow-off cock $b^4$ is closed and the water under pressure is admitted into the chamber C through the inlet-pipe E and branch $b^2$. The water, after filling the chamber C, will rise through the perforated partition D into the chamber C', and after filling the latter will pass through perforated partition D' and through the filtering medium in the intermediate chamber, and may be drawn off finally through the outlet-pipe $b^6$. The coarser impurities will be separated from the water by the perforated partitions D' and D, and will be deposited in the form of sediment upon the bottom of the chamber C, and the finer impurities will be entirely separated by the filtering medium in the intermediate chamber, $C^2$, so that perfectly clear water can be drawn from the latter.

In the drawing I have shown only one filter, but two or any larger number of the filters may be connected to form a continuous series, the outlet-pipe of one being attached to the inlet-pipe of the other, so that the water admitted to the first will traverse all the others before making its final exit. If the series be large enough, a continuous flow of cleared and cool water may be thus obtained.

What I claim as my invention is as follows:

1. The combination, with the vessel A, containing the filtering medium at $C^2$, and having the partition D' and terra-cotta plates F F', of the adjustable pressure-plate $D^2$ and the means, substantially as described, for varying the pressure of the same upon the filtering material.

2. The combination, with the vessel A, containing the sand or charcoal filter-packing at $C^2$, of terra-cotta plates F F', inclosing or sustaining the packing, and the partition D', supporting the same, substantially as shown and described.

In testimony that I claim the foregoing I have hereunto set my hand this 20th day of May, 1881.

LOUIS SCHARFF.

Witnesses:
S. J. VAN STAVOREN,
STANISLAUS REMAK.